United States Patent
Xu et al.

(10) Patent No.: US 10,459,589 B2
(45) Date of Patent: Oct. 29, 2019

(54) TOUCH SUBSTRATE COMPRISING RADIUSED TOUCH ELECTRODE BOUNDARIES MASK PLATE, AND METHOD FOR FABRICATING THE SAME

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Shifeng Xu, Beijing (CN); Ming Hu, Beijing (CN); Ming Zhang, Beijing (CN); Zouming Xu, Beijing (CN); Yu Zhu, Beijing (CN); Xinbin Tian, Beijing (CN); Qitao Zheng, Beijing (CN); Chunjian Liu, Beijing (CN)

(73) Assignees: BOE TECHNOLOGY GROUP CO., LTD., Beijing (CN); HEFEI XINSHING OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/542,237

(22) PCT Filed: Jul. 19, 2016

(86) PCT No.: PCT/CN2016/090437
§ 371 (c)(1),
(2) Date: Jul. 7, 2017

(87) PCT Pub. No.: WO2018/014187
PCT Pub. Date: Jan. 25, 2018

(65) Prior Publication Data
US 2018/0335919 A1    Nov. 22, 2018

(51) Int. Cl.
*G06F 3/044* (2006.01)

(52) U.S. Cl.
CPC .......... *G06F 3/0448* (2019.05); *G06F 3/0446* (2019.05); *G06F 3/0445* (2019.05);
(Continued)

(58) Field of Classification Search
CPC ...... G06F 3/044; G06F 3/0448; G06F 3/0446; G06F 3/0445; G06F 2203/04103; G06F 2203/04111; G06F 2203/04112
See application file for complete search history.

(56) References Cited

U.S. PATENT DOCUMENTS

| | | | |
|---|---|---|---|
| 2009/0303400 A1* | 12/2009 | Hou | G06F 3/0412 349/12 |
| 2010/0302201 A1* | 12/2010 | Ritter | G06F 3/044 345/174 |

(Continued)

FOREIGN PATENT DOCUMENTS

| | | |
|---|---|---|
| CN | 102446047 A | 5/2012 |
| CN | 103105980 A | 5/2013 |

(Continued)

OTHER PUBLICATIONS

International Search Report & Written Opinion dated Apr. 11, 2017, regarding PCT/CN2016/090437.

*Primary Examiner* — Darlene M Ritchie
(74) *Attorney, Agent, or Firm* — Intellectual Valley Law, P.C.

(57) ABSTRACT

The present application discloses a touch substrate having a plurality of touch electrodes, of which substantially all corners of substantially all boundaries are substantially radiused. A mask plate for fabricating the touch substrate and a fabricating method of the substrate are also provided.

17 Claims, 12 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 2012/0081333 A1 | 4/2012 | Ozeki et al. | |
| 2012/0194453 A1* | 8/2012 | Kim | G06F 3/0416 345/173 |
| 2013/0120257 A1* | 5/2013 | Park | G06F 3/041 345/158 |
| 2014/0043252 A1 | 2/2014 | Kim et al. | |
| 2014/0098057 A1 | 4/2014 | Lee et al. | |
| 2014/0124252 A1* | 5/2014 | Park | H05K 1/0289 174/257 |
| 2014/0246225 A1* | 9/2014 | Mizuno | G06F 3/044 174/255 |
| 2015/0130753 A1* | 5/2015 | Woo | G06F 3/044 345/174 |
| 2016/0178949 A1* | 6/2016 | Wang | G02F 1/13338 349/12 |
| 2016/0202826 A1* | 7/2016 | Han | G06F 1/16 345/174 |
| 2016/0342235 A1* | 11/2016 | Chang | G06F 3/044 |
| 2016/0378225 A1* | 12/2016 | Wang | G06F 3/0412 345/174 |
| 2017/0139510 A1* | 5/2017 | Lang | G01L 5/0038 |

FOREIGN PATENT DOCUMENTS

| | | |
|---|---|---|
| CN | 103713789 A | 4/2014 |
| CN | 105487698 A | 4/2016 |
| CN | 106227381 A | 12/2016 |

* cited by examiner

TOUCH SUBSTRATE COMPRISING RADIUSED TOUCH ELECTRODE BOUNDARIES MASK PLATE, AND METHOD FOR FABRICATING THE SAME

CROSS-REFERENCE TO RELATED APPLICATION

This application is a national stage application under 35 U.S.C. § 371 of International Application No. PCT/CN2016/090437 filed Jul. 19, 2016, the contents of which are incorporated by reference in the entirety.

TECHNICAL FIELD

The present invention relates to display technology, more particularly, to a touch substrate, a mask plate for fabricating the same, and a fabricating method thereof.

BACKGROUND

Touch control display panels have found a wide range of applications in display field. A conventional touch control display panel includes a plurality of first touch electrodes arranged in columns forming a plurality of first conductive channels, and a plurality of second touch electrode in rows forming a plurality of second conductive channels. Two adjacent first touch electrodes along a column are connected through a first bridge. Two adjacent second touch electrodes along a row are connected through a second bridge. When a finger touches a point on the touch control display panel, the capacitor formed by the finger superimposes on the touch panel capacitor, resulting in a change in the capacitance of the touch panel capacitor. In a mutual capacitive touch display panel, the first electrode may be a sensing electrode and the second electrode may be a driving electrode. In detecting touch events, the mutual capacitive touch display panel examines the first electrode array and the second electrode array sequentially. Based on the capacitance change upon a touch event, the coordinates of the first electrode and the second electrode being touched may be determined. Touch resolution correlates with the distance between adjacent conductive channels. A smaller distance between adjacent conductive channels results in a higher touch resolution.

SUMMARY

In one aspect, the present invention provides a touch substrate comprising a plurality of touch electrodes, wherein substantially all corners of substantially all boundaries of the plurality of touch electrodes are substantially radiused.

Optionally, substantially all boundaries of the plurality of touch electrodes are continuously smoothly curved.

Optionally, a boundary of a touch electrode consists essentially of a plurality of continuous smooth curves adjacently connected by a radiused corner.

Optionally, a boundary of a touch electrode consists essentially of a single continuous smooth curve.

Optionally, a boundary of a touch electrode includes a straight portion.

Optionally, the touch substrate further comprises a plurality of fill patterns, wherein substantially all corners of substantially all boundaries of the plurality of fill patterns are substantially radiused.

Optionally, substantially all boundaries of the plurality of fill patterns are continuously smoothly curved.

Optionally, a boundary of a fill pattern consists essentially of a plurality of continuous smooth curves adjacently connected by a radiused corner.

Optionally, a boundary of a fill pattern consists essentially of a single continuous smooth curve.

Optionally, at least one of the plurality of fill patterns is a mosaic pattern comprising at least two sub-patterns, substantially all corners of substantially all boundaries of the at least two sub-patterns are substantially radiused.

Optionally, the plurality of fill patterns have a boundary substantially complementary to corresponding portions of adjacent touch electrodes.

Optionally, a boundary of a fill pattern includes a straight portion.

Optionally, the plurality of touch electrodes comprise a plurality of rows of first touch electrodes and a plurality of columns of second touch electrodes; two adjacent rows of first touch electrodes being mutually insulated from each other along a column direction at an insulated intersection; two adjacent columns of second touch electrodes being mutually insulated from each other along a row direction at the insulated intersection; and any protrusion of the two adjacent rows of first touch electrodes and the two adjacent columns of second touch electrodes at the insulated intersection is radiused.

Optionally, the plurality of touch electrodes comprise a plurality of rows of first touch electrodes and a plurality of columns of second touch electrodes; and each first touch electrode has a boundary substantially complementary to corresponding portions of adjacent second touch electrodes.

Optionally, a boundary of each first touch electrode has a substantially circular shape.

Optionally, the touch substrate further comprises a plurality of fill patterns, wherein each first touch electrode and adjacent fill patterns form a boundary having a substantially circular shape.

In another aspect, the present invention provides a method of fabricating a touch substrate comprising forming a plurality of touch electrodes on a substrate; wherein substantially all corners of substantially all boundaries of the plurality of touch electrodes are formed to be substantially radiused.

Optionally, substantially all boundaries of the plurality of touch electrodes are formed to be continuously smoothly curved.

In another aspect, the present invention provides a mask plate for fabricating a touch substrate described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1A:
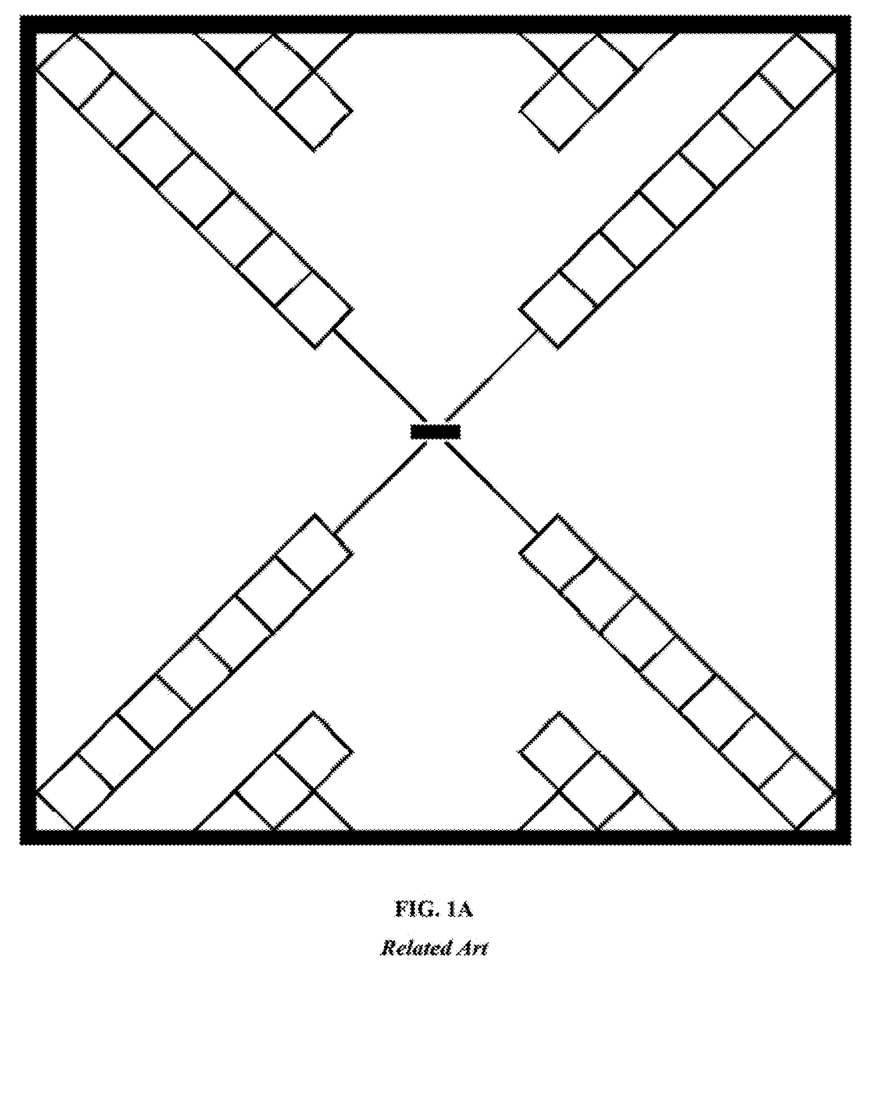
FIGS. 1A-1C are diagrams illustrating conventional touch electrode patterns.
Figure 1B:
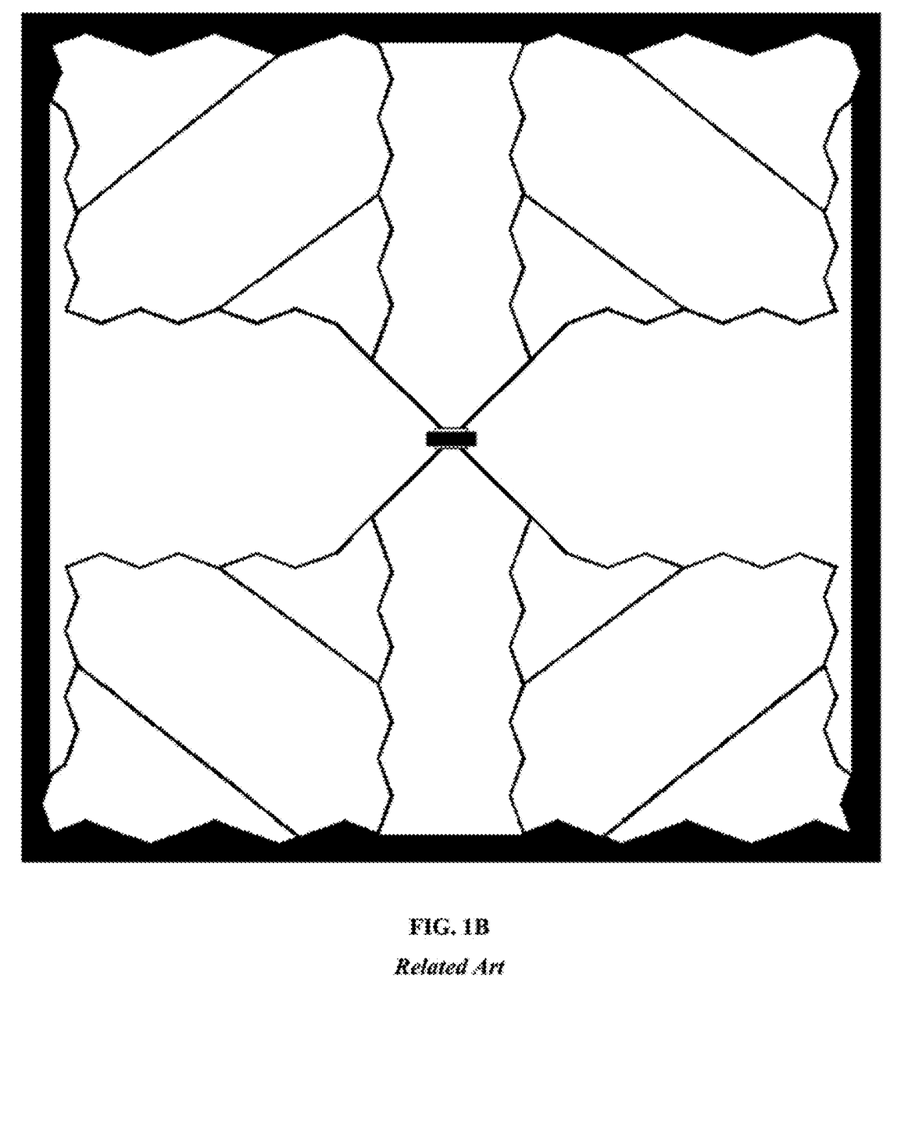
Figure 1C:
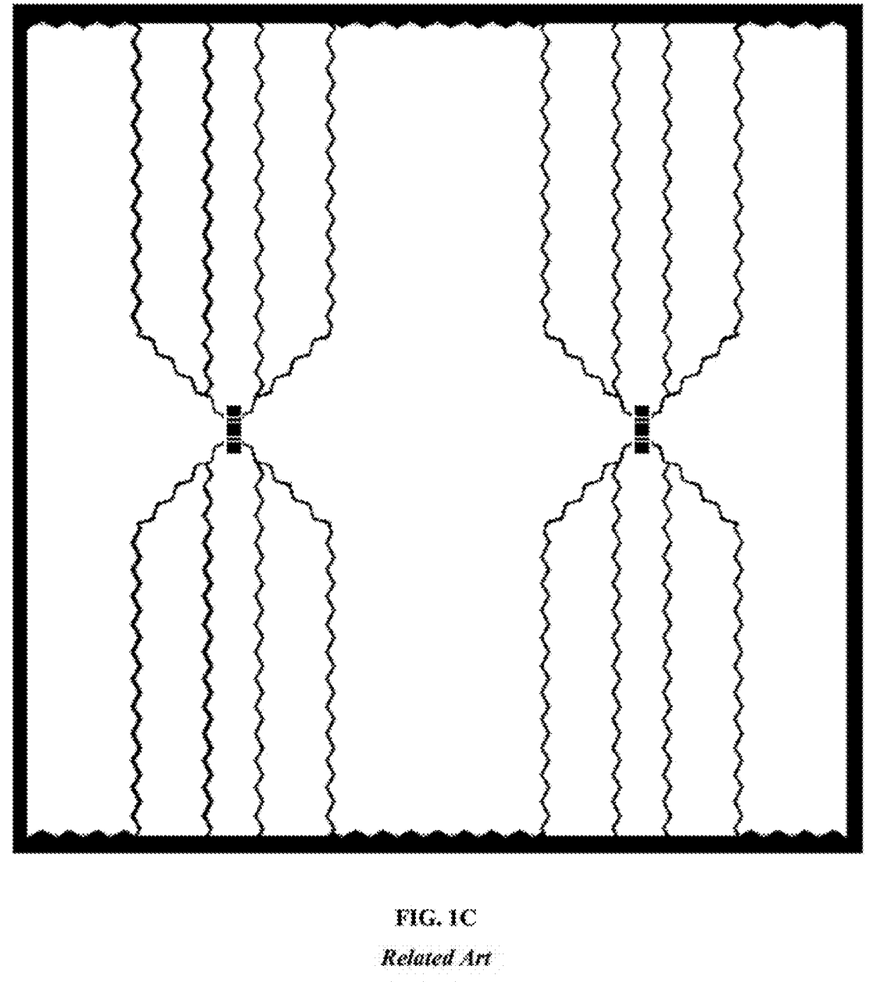

FIGS. 1A-1C are diagrams illustrating conventional touch electrode patterns. Referring to FIGS. 1A-1C, the conventional touch electrodes having a pattern consisting of straight lines connected together by sharp edges. Electrostatic charges are prone to accumulate around these sharp edges, leading to electrostatic breakdowns in the touch panel. For example, accumulation of electrostatic charges around a sharp edge may result in a high relative value of the product of capacitance and resistance (ADC) around the sharp edge. When the ADC is too high, the charging time of the touch panel increases, the report rate of the touch panel decreases, and it is more difficult to adjust the F/W of the touch integrated circuit, all of which adversely affecting the performance of the touch screen. The electrostatic breakdowns may result in a short between touch electrodes, e.g., between a sensing electrode and a driving electrode, and render that touch display panel dysfunctional. Moreover, touch electrodes with a pattern having straight lines may be associated with severe mura defects and poor blanking effects, e.g., in an add-on type touch display panel such as a one-glass-solution type touch display panel.

Accordingly, the present disclosure provides a novel touch substrate, a mask plate for fabricating the same, and a fabricating method thereof that substantially obviate one or more of the problems due to limitations and disadvantages of the related art. In one aspect, the present disclosure provides a touch substrate. In some embodiments, the touch substrate includes a plurality of touch electrodes having radiused corners, e.g., substantially all corners of substantially all boundaries of the plurality of touch electrodes are substantially radiused. In some embodiments, the touch substrate includes a plurality of touch electrodes having a continuously smoothly curved boundary, e.g., substantially all boundaries of the plurality of touch electrodes are continuously smoothly curved. In some embodiments, the touch substrate includes a plurality of touch electrodes having radiused corners and continuously smoothly curved boundaries, e.g., substantially all corners of substantially all boundaries of the plurality of touch electrodes are substantially radiused; and substantially all boundaries of the plurality of touch electrodes are continuously smoothly curved.

As used herein, the term "radiused" in the context of electrode boundary refers to a corner of the boundary that has been smoothed to a substantially rounded shape, e.g., the corner is to have a gentle, gradual transition from a first direction to a second direction. The substantially rounded shape may be, for example, a substantially circular form (e.g., a half circle, a quarter circle), a substantially arc form, a substantially parabolic form, or any combination thereof, as long as any sharp edge is to be avoided. Optionally, the corner is a convex corner. Optionally, the corner is a concave corner. Optionally, the corner is a corner of a protrusion. Optionally, the corner is a corner of a recess. Optionally, a radiused corner is a radiused protrusion. Optionally, a radiused corner is a radiused recess.

As used herein, the term "continuously smoothly curved" in the context of electrode boundary refers a boundary substantially free of a straight portion. The boundary may consist of a single continuous, smooth curve, or may include a plurality of continuous, smooth curves connected by one or more radiused corner, e.g., a radiused protrusion, a radiused recess, or a combination thereof. Optionally, the boundary consists essentially of a plurality of continuous, smooth curves adjacently connected by a radiused corner. The boundary may have, for example, a circular shape (e.g., a half circle, a quarter circle), a sinusoidal shape, an elliptical shape, a parabola shape, an arc shape, or any combination thereof.

Figure 2A:
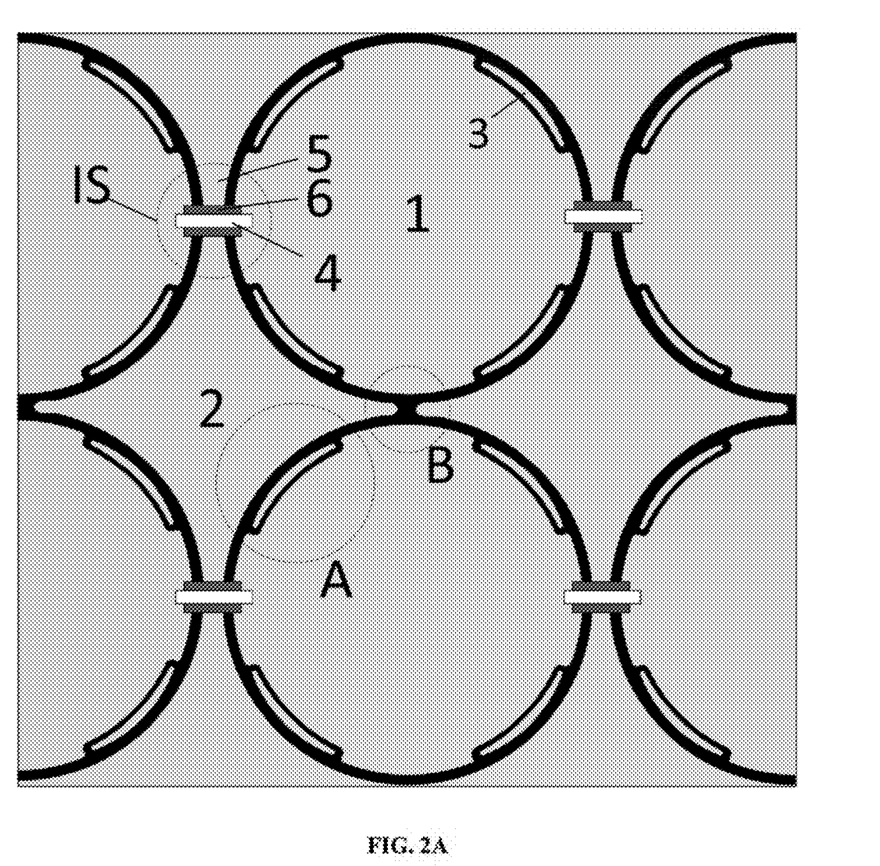
FIGS. 2A-2D are diagrams illustrating touch electrode patterns in some embodiments.

In one aspect, the present disclosure provides a plurality of touch electrodes having radiused corners. FIGS. 2A-2D are diagrams illustrating touch electrode patterns in some embodiments. Referring to FIG. 2A, the touch substrate in the embodiment includes a first touch electrode layer having a plurality rows of first touch electrodes 1 and a second touch electrode layer having a plurality of columns of second touch electrodes 2. The plurality rows of first touch electrodes 1 and the plurality of columns of second touch electrodes 2 cross over each other forming a plurality of intersections IS. Adjacent first touch electrodes 1 are electrically connected at each intersection IS through a plurality of first bridges 4, and adjacent second touch electrodes 2 are electrically connected at each intersection IS through a plurality of second bridges 5. The first bridge 4 and the second bridge 5 are electrically insulated by an insulating layer 6. For example, the first touch electrode 1 may be a touch scanning electrode (Tx) and the second touch electrode 2 may be a touch sensing electrode (Rx). Each row of first transparent touch electrodes 1 may be connected with a touch scanning line and each column of second transparent touch electrodes 2 may be connected with a touch sensing line. Mutual capacitance is created between rows of first touch electrodes 1 and columns of second touch electrodes 2 in the proximity of intersections IS. When a finger or an object touches near an intersection IS, some of the mutual capacitance between the row and column is coupled to the finger or the object thereby reducing the capacitance at the intersection. The touch location may be detected based on the change of mutual capacitance.

Referring to FIG. 2A, two adjacent rows of first touch electrodes 1 are mutually insulated from each other along a column direction at an insulated intersection B, and two adjacent columns of second touch electrodes 2 are mutually insulated from each other along a row direction at the insulated intersection B.

Referring to FIG. 2A, the touch substrate in the embodiment further includes a fill pattern layer having a plurality of fill patterns 3 (e.g., a plurality of dummy electrodes). The plurality of fill patterns 3 have a boundary substantially complementary to corresponding portions of adjacent touch electrodes. For example, plurality of fill patterns 3 have a boundary substantially complementary to corresponding portions of adjacent first touch electrodes 1 and second touch electrodes 2. The first touch electrode 1, the second touch electrode 2, and the fill pattern 3 are electrically isolated from each other.

Figure 2B:
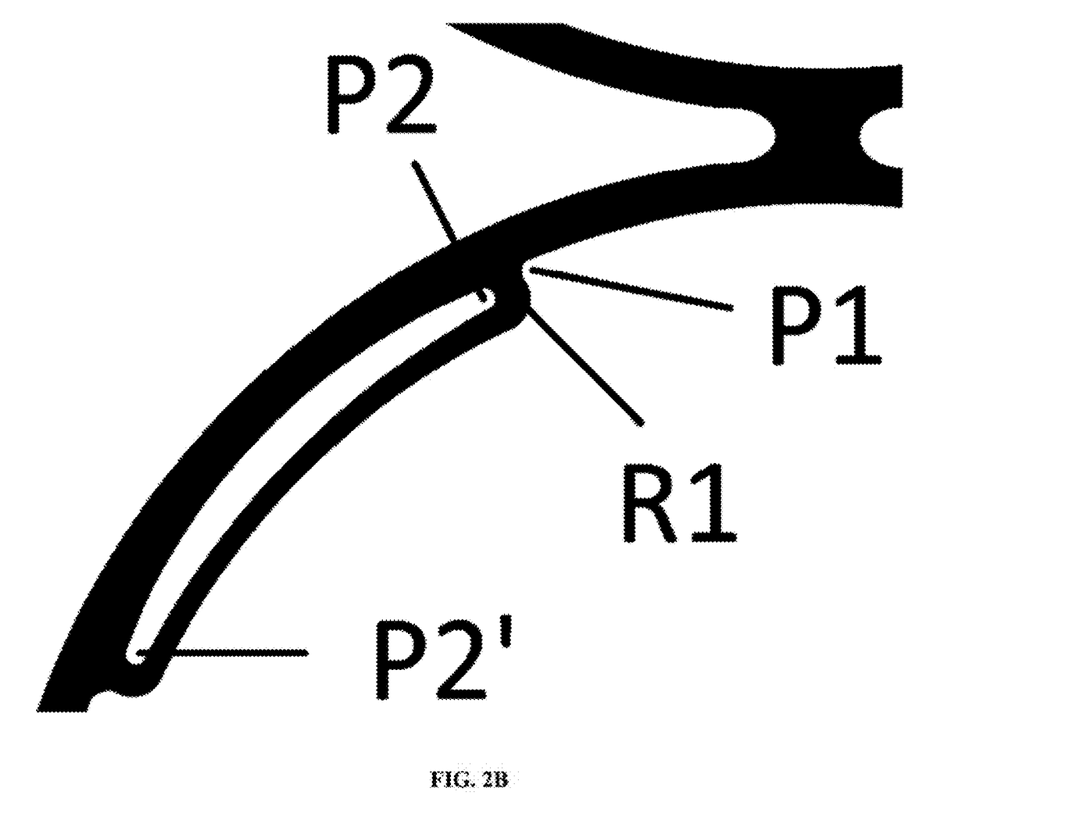

In some embodiments, the touch substrate includes a plurality of touch electrodes having radiused corners, e.g., substantially all corners of substantially all boundaries of all touch electrodes are substantially radiused. FIG. 2B is a diagram illustrating the structure of the touch substrate corresponding to the area "A" in FIG. 2A. As shown in FIG. 2A and FIG. 2B, the corners of the first touch electrode 1 are substantially radiused. The corner may be a radiused convex corner P1 (e.g., a radiused protrusion P1) or a radiused concave corner R1 (e.g., a radiused recess R1). As shown in FIG. 2A, the first touch electrode 1 has all corners of its boundary radiused so that there are no sharp edges in the boundary.

Figure 2C:
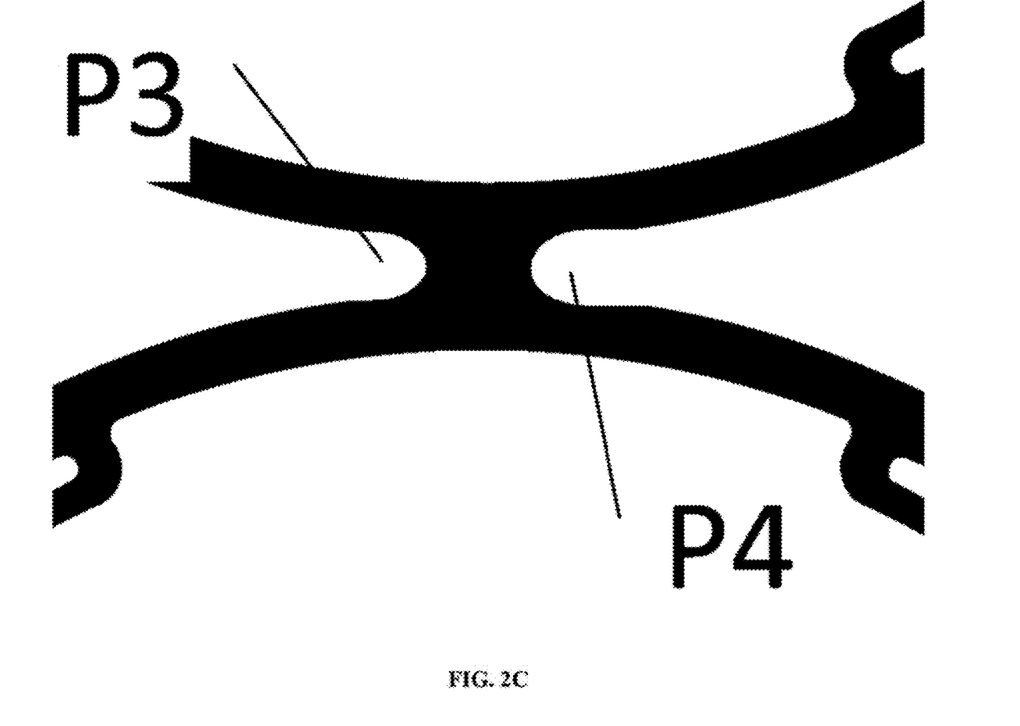

FIG. 2C is a diagram illustrating the structure of the touch substrate corresponding to the area "B" in FIG. 2A in some touch substrates. The area "B" corresponds to an insulated intersection where two adjacent rows of first touch electrodes 1 are mutually insulated from each other along a column direction at the insulated intersection B and two adjacent columns of second touch electrodes 2 are mutually insulated from each other along a row direction at the insulated intersection B. As shown in FIG. 2A and FIG. 2C, any protrusion of the two adjacent rows of first touch electrodes 1 and the two adjacent columns of second touch electrodes 2 at the insulated intersection B is radiused. The corner may be a radiused convex corner or a radiused concave corner. For example, in FIG. 2C, two convex corners P3 and P4 of the second touch electrode 2 are substantially radiused. The two radiused convex corners P3 and P4 have a substantially half circle shape. As shown in FIG. 2A, the second touch electrode 2 has all corners of its boundary radiused so that there are no sharp edges in the boundary.

Figure 2D:
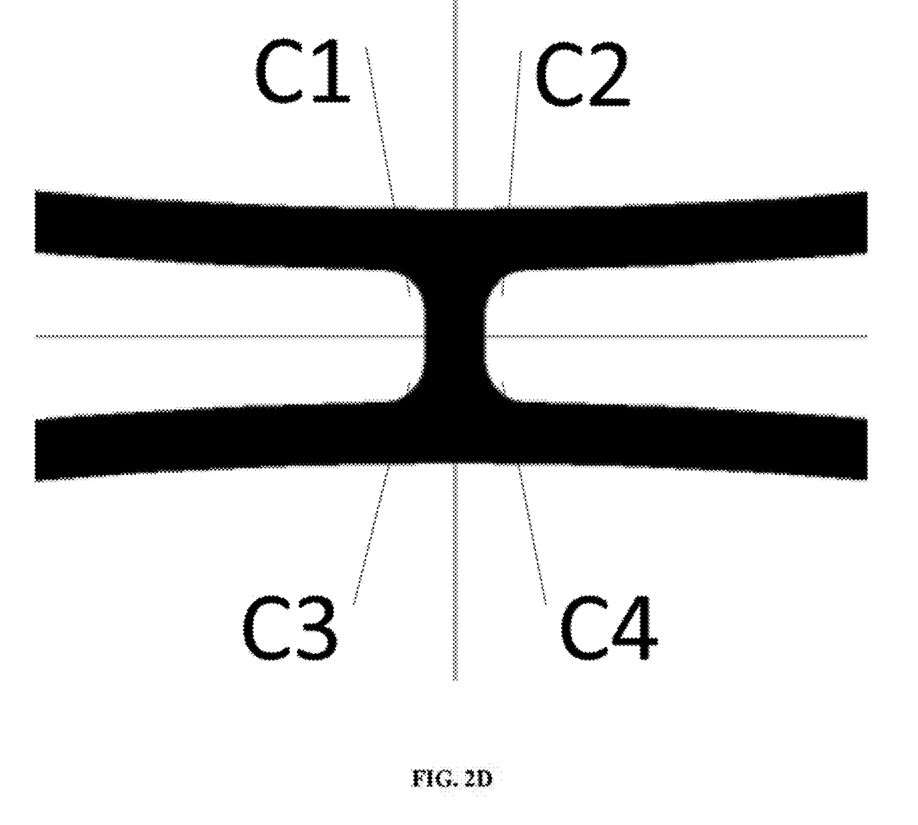

FIG. 2D is a diagram illustrating the structure of the touch substrate corresponding to the area "B" in FIG. 2A in some touch substrates. In FIG. 2D, four convex corners C1, C2, C3, and C4 of the second touch electrode 2 are substantially radiused. The radiused convex corners C, C2, C3, and C4 have a substantially quarter circle shape.

In some embodiments, substantially all corners of substantially all boundaries of the plurality of fill patterns are substantially radiused. Referring to FIG. 2A and FIG. 2B, the fill pattern 3 of the touch substrate has two radiused corners P2 and P2'. The two convex corners P2 and P2' have a substantially half circle shape. As shown in FIG. 2A, the fill pattern 3 has all corners of its boundary radiused so that there are no sharp edges in the boundary.

Figure 3A:
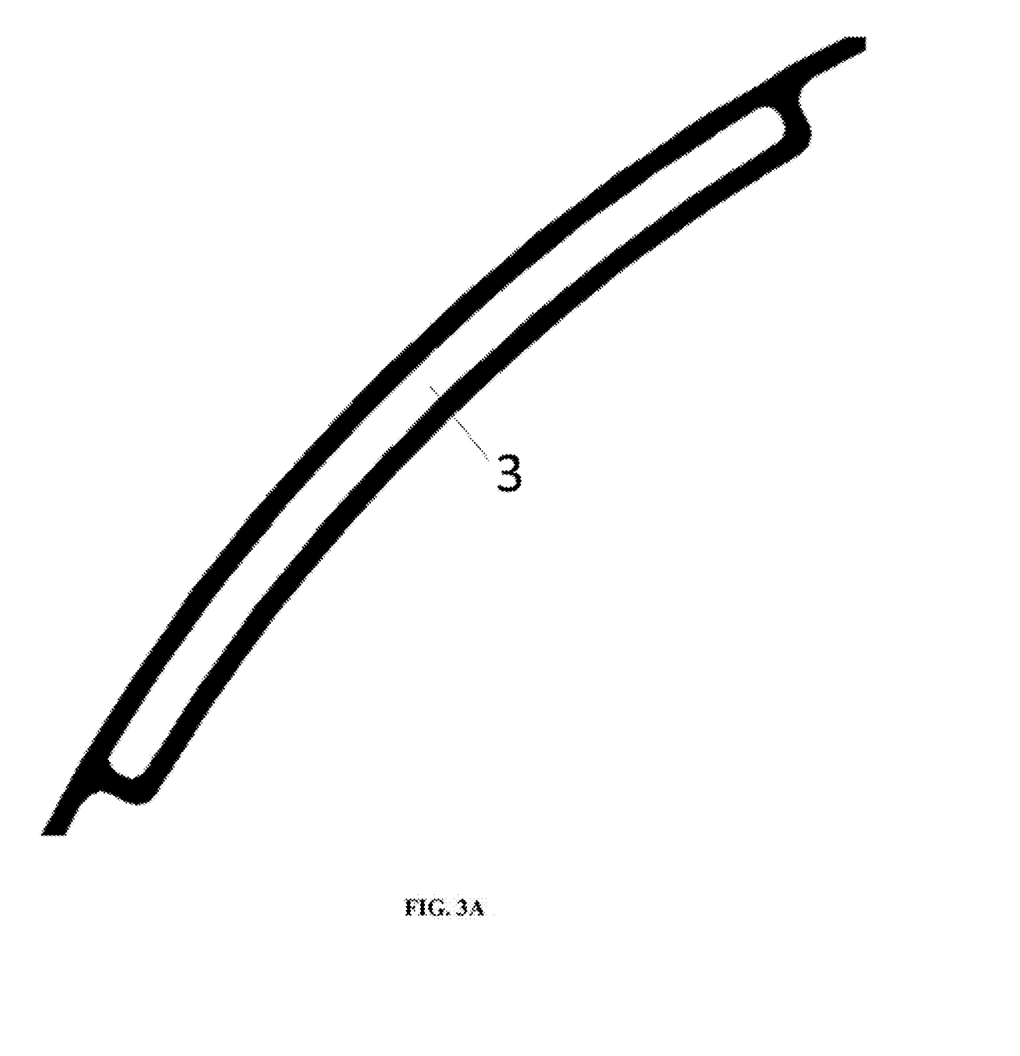
FIGS. 3A-3B are diagrams illustrating fill patterns in some embodiments.

FIGS. 3A-3B are diagrams illustrating the structures of fill patterns in some embodiments. Referring to FIG. 3A, the fill pattern 3 is a fill pattern corresponding to the fill pattern inside the area A in FIG. 2A. As shown in FIG. 2A and FIG. 3A, the fill pattern 3 is between a first electrode 1 and a second electrode 2. The fill pattern 3 in the embodiment is an integral fill pattern having all corners in the boundary radiused.

Figure 3B:
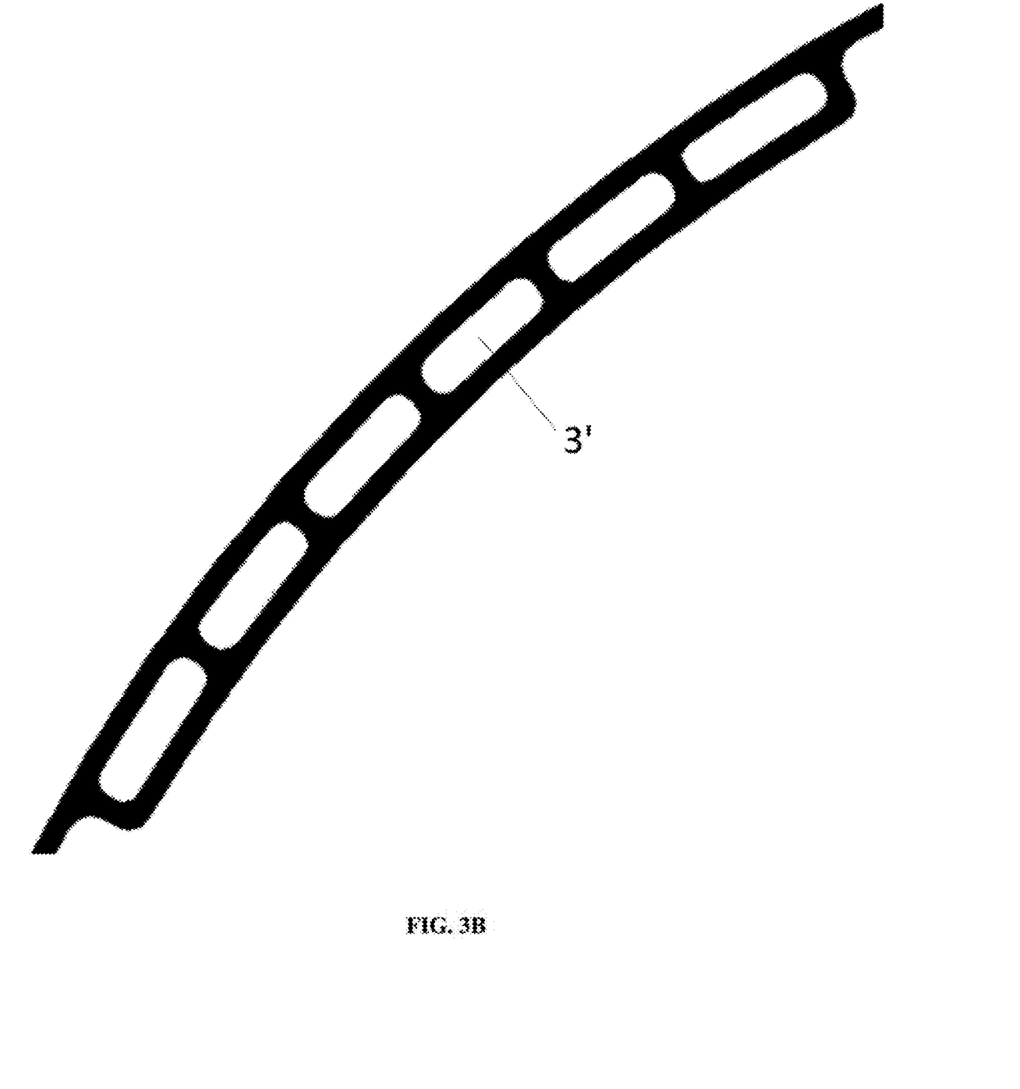

In some embodiments, the fill pattern may be a mosaic pattern including at least two sub-patterns to achieve a better blanking effect. Referring to FIG. 3B, the fill pattern in the embodiments includes six sub-patterns 3' isolated from each other and from the adjacent first touch electrode and second touch electrode. All sub-patterns 3' have all of their corners in the boundaries radiused.

Figure 4A:
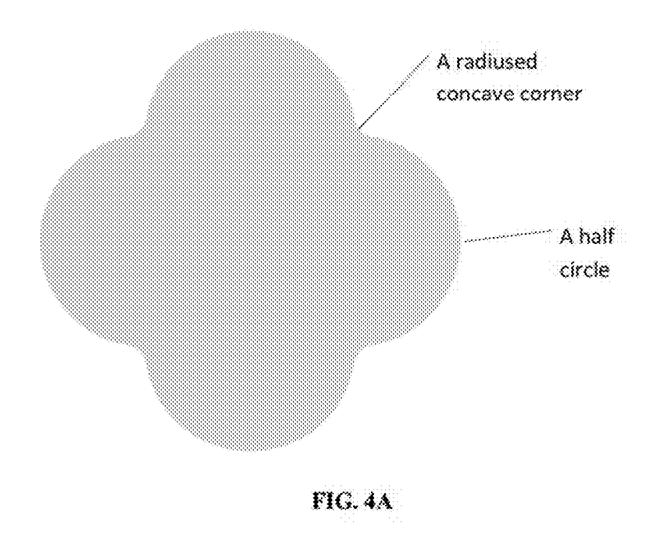
FIGS. 4A-4D are diagrams illustrating touch electrode patterns in some embodiments.
Figure 4B:
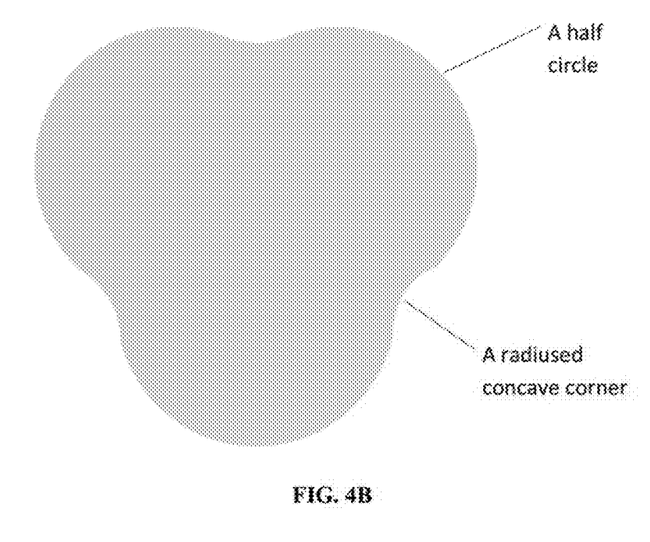
Figure 4C:
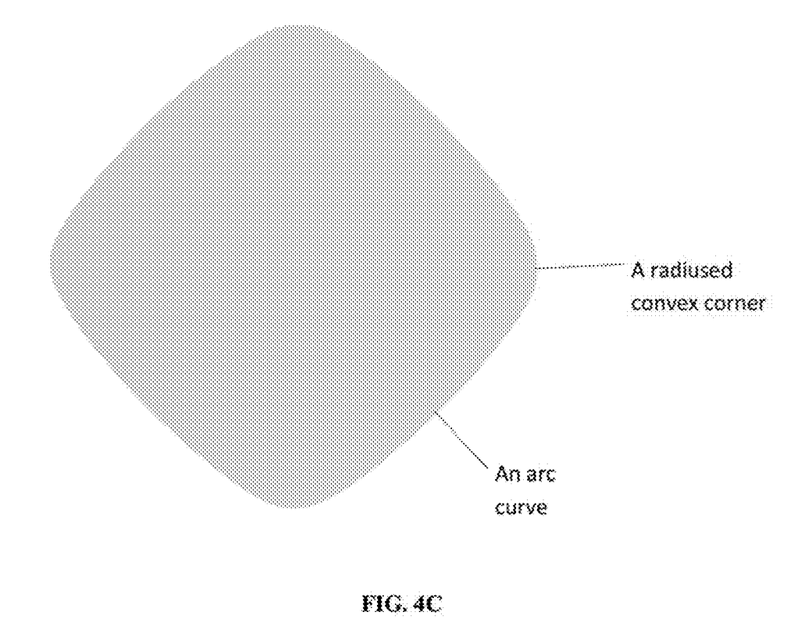

In another aspect, the present disclosure provides a plurality of touch electrodes having a continuously smoothly curved boundary, e.g., substantially all boundaries of the plurality of touch electrodes are continuously smoothly curved. Various appropriate boundary shapes may be used to make the touch electrode. Examples of appropriate shapes include, but are not limited to, a circular shape (including a half circle, a quarter circle, etc.), a sinusoidal shape, an elliptical shape, a parabola shape, an arc shape, and any combination thereof. For example, the touch electrode may have a substantially circular shaped boundary (e.g., a boundary of the first touch electrode 1 in FIG. 2A). The touch electrode may have a substantially arc shaped boundary (e.g., a boundary of the second touch electrode 2 in FIG. 2A having four arcs). FIGS. 4A-4C are diagrams illustrating touch electrode patterns in some embodiments. Referring to FIG. 4A, the touch electrode may have a substantially quatrefoil shape having all corners (including convex corners and concave corners) radiused. Referring to FIG. 4B, the touch electrode may have a substantially trefoil shape having all corners (including convex corners and concave corners) radiused. Referring to FIG. 4C, the touch electrode may have a boundary having a substantially square shape having all corners being radiused and all sides being smoothly curved arcs.

In some embodiments, a boundary of a touch electrode consists essentially of a single continuous smooth curve. Examples of boundaries having a single continuous smooth curve include, but are not limited to, a substantially circular shaped boundary, a substantially elliptical shaped boundary, and a substantially oval shaped boundary.

In some embodiments, a touch electrode and adjacent fill patterns form a boundary consisting essentially of a single continuous smooth curve except for the portions where the fill patterns are isolated from the touch electrode. Examples of boundaries having a single continuous smooth curve include, but are not limited to, a substantially circular shaped boundary, a substantially elliptical shaped boundary, and a substantially oval shaped boundary. For example, the first touch electrode 1 and four adjacent fill patterns 3 in FIG. 2A form a substantially circular shaped boundary, except for gaps between the fill patterns 3 and the first touch electrode 1.

In some embodiments, the boundary of a touch electrode consists essentially of a plurality of continuous smooth curves adjacently connected by a radiused corner (e.g. a plurality of radiused corners). Referring to FIG. 4A, the touch electrode in the embodiment has a boundary consisting essentially of four half circles adjacently connected by four radiused concave corners. Referring to FIG. 4B, the touch electrode in the embodiment has a boundary consisting essentially of three half circles adjacently connected by three radiused concave corners. Referring to FIG. 4C, the touch electrode in the embodiment has a boundary consisting essentially of four arc curves adjacently connected by four radiused convex corners. Referring to FIGS. 2A-2C, the boundary of the first touch electrode 1 consists essentially of eight arc curves adjacently connected by eight pairs of a radiused convex corner P1 and a radiused concave corner R1. The boundary of the second touch electrode 2 consists essentially of four arc curves adjacently connected by a radiused convex corner P3 and a radiused convex corner P4.

Figure 4D:
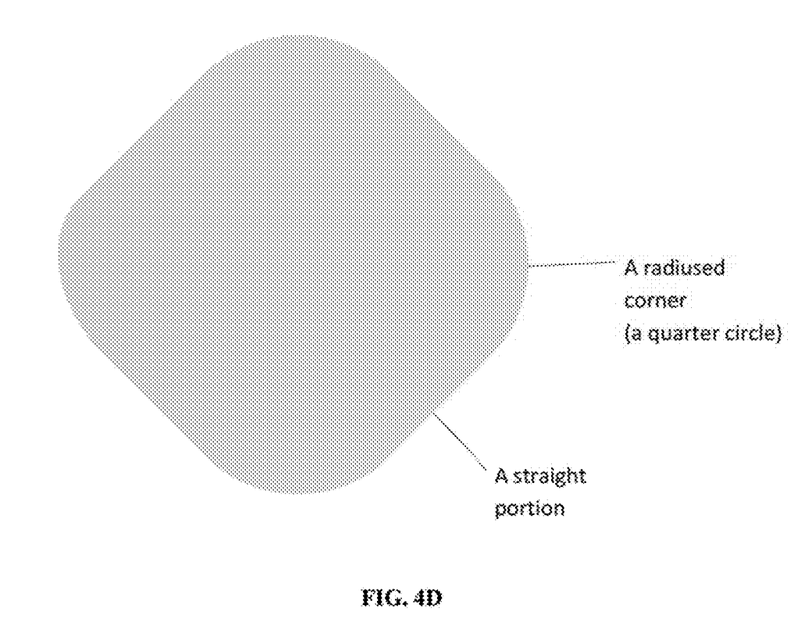

In some embodiments, substantially all corners of substantially all boundaries of the plurality of touch electrodes are substantially radiused, and a boundary of a touch electrode may optionally include a straight portion. FIG. 4D is a diagram illustrating a touch electrode pattern in some embodiments. Referring to FIG. 4D, the boundary of the touch electrode in the embodiment consists essentially of four straight portions connected by four radiused corners (e.g., four half circles as shown in FIG. 4D). Optionally, the straight portion is connected to other portions of the boundary through a radiused corner.

In some embodiments, the straight portion smoothly transitions into an adjacent portion without a radiused corner. For example, a straight portion may be smoothly connected to an adjacent half circle or quarter circle without a radiused corner as long as a tangent of the adjacent half circle or quarter circle at the connecting point substantially overlaps with the straight portion. Referring to FIG. 2D, a second touch electrode 2 in area "B" has a boundary including a first arc curve connected to a first radiused convex corner C1, a second arc curve connected to a second radiused convex corner C3, and a short straight portion connecting the first radiused convex corner C1 and the second radiused convex corner C3. The straight portion between the first radiused convex corner C1 and the second radiused convex corner C3 smoothly transitions into the adjacent first radiused convex corner C1 and second radiused convex corner C3, as the tangents of the first radiused convex corner C1 and second radiused convex corner C3 overlap with the straight portion at their connecting points, respectively.

In some embodiments, the fill pattern or sub-pattern has a continuously smoothly curved boundary, e.g., substantially all boundaries of the plurality of fill patterns or sub-patterns thereof are continuously smoothly curved. Various appropriate boundary shapes may be used to make the touch electrode. Examples of appropriate shapes include, but are not limited to, a circular shape (including a half circle, a quarter circle, etc.), a sinusoidal shape, an elliptical shape, a parabola shape, an arc shape, and any combination thereof. For example, the boundary of the fill pattern in FIG. 2B consists essentially of two arc curves connected by two radiused convex corners P2 and P2'. Similarly, the boundary of each sub-pattern 3' in FIG. 3B consists essentially of two arc curves connected by two radiused convex corners.

In some embodiments, a boundary of a fill pattern or sub-pattern consists essentially of a single continuous smooth curve. Examples of boundaries having a single continuous smooth curve include, but are not limited to, a substantially circular shaped boundary, a substantially elliptical shaped boundary, and a substantially oval shaped boundary.

In some embodiments, the boundary of a fill pattern or sub-pattern consists essentially of a plurality of continuous smooth curves adjacently connected by a radiused corner (e.g. a plurality of radiused corners). Referring to FIG. 2B, the boundary of the fill pattern in the embodiment consists essentially of two continuous smooth arc curves adjacently connected by two radiused convex corners P2 and P2'. Referring to FIG. 3B, the boundary of each sub-pattern in the embodiment consists essentially of two continuous smooth arc curves adjacently connected by two radiused convex corners.

In some embodiments, substantially all corners of substantially all boundaries of the plurality of fill patterns or sub-patterns are substantially radiused, and a boundary of a fill pattern or sub-pattern may optionally include a straight portion. Optionally, the straight portion is connected to other portions of the boundary through a radiused corner. Optionally, the straight portion smoothly transitions into an adjacent portion without a radiused corner.

Optionally, the plurality of touch electrodes have a boundary substantially complementary to each other. Optionally, the touch substrate includes a plurality of fill patterns, the fill pattern has a boundary substantially complementary to corresponding portions of adjacent touch electrodes. Optionally, the plurality of touch electrodes include a plurality of rows of first touch electrodes and a plurality of columns of second touch electrodes, and each first touch electrode has a boundary substantially complementary to corresponding portions of adjacent second touch electrodes. Optionally, the touch substrate includes a plurality of rows of first touch electrodes, a plurality of columns of second touch electrodes, and a plurality of fill patterns, the fill pattern has a boundary substantially complementary to corresponding portions of adjacent first touch electrodes and second touch electrodes.

In another aspect, the present disclosure provides a method of fabricating a touch substrate. In some embodiments, the method includes forming a plurality of touch electrodes on a substrate so that substantially all corners of substantially all boundaries of all touch electrodes are formed to be substantially radiused. Optionally, the method includes forming a plurality rows of first touch electrodes and forming a plurality of columns of second touch electrodes so that substantially all corners of substantially all boundaries of the first touch electrodes and second touch electrodes are formed to be substantially radiused. Optionally, the method further includes forming a plurality of fill patterns so that substantially all corners of substantially all boundaries of the plurality of fill patterns are substantially radiused. Optionally, the step of forming the plurality of fill patterns includes forming a mosaic pattern comprising at least two sub-patterns, substantially all corners of substantially all boundaries of the sub-patterns are formed to be substantially radiused.

In some embodiments, substantially all boundaries of the plurality of touch electrodes are formed to be continuously smoothly curved. Optionally, the step of forming the plurality of touch electrodes includes forming at least one touch electrode, the boundary of which is formed to consist essentially of a plurality of continuous smooth curves adjacently connected by a radiused corner. Optionally, the step of forming the plurality of touch electrodes includes forming at least one touch electrode, the boundary of which is formed to consist essentially of a single continuous smooth curve.

In some embodiments, substantially all boundaries of the plurality of fill patterns are formed to be continuously smoothly curved. Optionally, the step of forming the plurality of fill patterns includes forming at least one fill pattern, the boundary of which is formed to consist essentially of a plurality of continuous smooth curves adjacently connected by a radiused corner. Optionally, the step of forming the plurality of fill patterns includes forming at least one fill pattern, the boundary of which is formed to consist essentially of a single continuous smooth curve. Optionally, the plurality of fill patterns are formed to have a boundary substantially complementary to corresponding portions of adjacent touch electrodes.

In some embodiments, substantially all boundaries of sub-patterns of the plurality of fill patterns are formed to be continuously smoothly curved. Optionally, the step of forming the plurality of fill patterns includes forming at least one sub-pattern, the boundary of which is formed to consist essentially of a plurality of continuous smooth curves adjacently connected by a radiused corner. Optionally, the step of forming the plurality of fill patterns includes forming at least one sub-pattern, the boundary of which is formed to consist essentially of a single continuous smooth curve.

In some embodiments, substantially all corners of substantially all boundaries of all touch electrodes are formed to be substantially radiused, and a boundary of a touch electrode is formed to include a straight portion. Optionally, the straight portion is connected to other portions of the boundary through a radiused corner. Optionally, the straight portion smoothly transitions into an adjacent portion without a radiused corner.

In some embodiments, substantially all boundaries of the plurality of fill patterns are substantially radiused, and a boundary of a fill pattern is formed to include a straight portion. Optionally, the straight portion is connected to other portions of the boundary through a radiused corner. Optionally, the straight portion smoothly transitions into an adjacent portion without a radiused corner.

In some embodiments, substantially all corners of substantially all boundaries of the sub-patterns are formed to be substantially radiused, and a boundary of a sub-pattern is formed to include a straight portion. Optionally, the straight portion is connected to other portions of the boundary through a radiused corner. Optionally, the straight portion smoothly transitions into an adjacent portion without a radiused corner.

In some embodiments, the method includes forming a plurality rows of first touch electrodes and forming a plurality of columns of second touch electrodes so that substantially all corners of substantially all boundaries of the first touch electrodes and second touch electrodes are formed to be substantially radiused. Optionally, two adjacent rows of first touch electrodes are formed to be mutually insulated from each other along a column direction at an insulated intersection, two adjacent columns of second touch electrodes are formed to be mutually insulated from each other along a row direction at the insulated intersection, and any protrusion of the two adjacent rows of first touch electrodes and the two adjacent columns of second touch electrodes at the insulated intersection is formed to be radiused. Optionally, each first touch electrode is formed to have a boundary substantially complementary to corresponding portions of adjacent second touch electrodes.

In some embodiments, the step of forming the plurality of first touch electrodes includes forming a plurality of first touch electrodes, each of which is formed to have a boundary having a continuously smoothly curved boundary. Optionally, the plurality of first touch electrodes and the plurality of fill patterns are formed so that each first touch electrode and its adjacent fill patterns form a boundary having a continuously smoothly curved boundary. Examples of boundaries having a single continuous smooth curve include, but are not limited to, a substantially circular shaped boundary, a substantially elliptical shaped boundary, and a substantially oval shaped boundary.

In some embodiments, the method includes using a mask plate having a pattern corresponding to the plurality of touch electrodes. Optionally, the method includes using a mask plate having a pattern corresponding to the plurality of touch electrodes and a plurality of fill patterns. Optionally, substantially all corners of substantially all boundaries of the pattern are substantially radiused. Optionally, substantially all boundaries of the pattern are continuously smoothly curved.

In another aspect, the present disclosure provides a mask plate for fabricating the touch substrate described herein. In some embodiments, the pattern of the mask plate includes a pattern corresponding to the plurality of touch electrodes, and substantially all corners of a boundary of the pattern are substantially radiused. Optionally, substantially all boundaries of the pattern are continuously smoothly curved.

Figure 5:
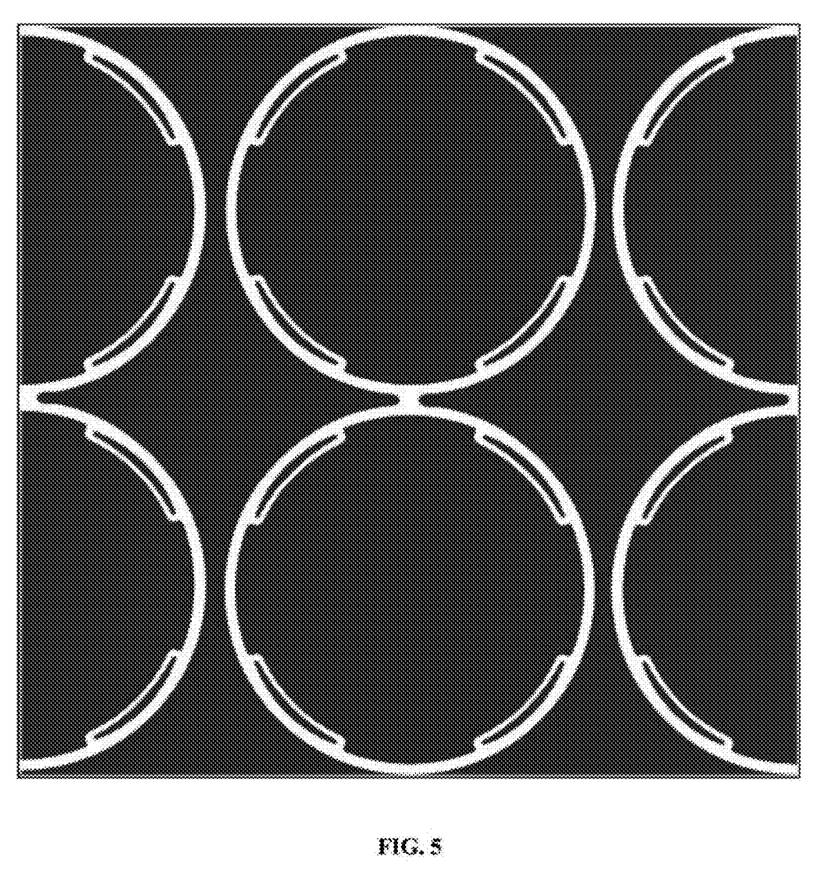
FIG. 5 is a diagram illustrating the structure of a mask plate in some embodiments.

FIG. 5 is a diagram illustrating the structure of a mask plate in some embodiments. Referring to FIG. 5, the mask plate in the embodiment has a pattern corresponding to a plurality of first touch electrodes, a plurality of second touch electrodes, and a plurality of fill patterns. All corners of substantially all boundaries of the pattern are substantially radiused, and substantially all boundaries of the pattern are continuously smoothly curved.

In another aspect, the present disclosure provides a touch display panel having a touch substrate described herein or fabricated by a method described herein. The present touch display panel obviates the problems of electrostatic breakdowns and severe mura defects associated with the conventional touch display panels. The present touch display panel has an excellent blanking effect, minimized mura defects, and is not prone to electrostatic breakdowns between touch electrodes. Optionally, the touch display panel is a self-capacitive touch display panel. Optionally, the touch display panel is a mutual capacitive touch display panel.

Optionally, the touch display panel is an in-cell touch panel. Optionally, the touch display panel is an on-cell touch panel. Optionally, the touch display panel is an add-on type touch panel. Optionally, the add-on type touch display panel has touch electrodes embedded on a glass surface. Optionally, the add-on type touch display panel has touch electrodes embedded on a thin film. Optionally, the add-on type touch display panel is a one-glass-solution type touch display panel. In the one-glass-solution type touch panel, touch electrodes are integrated on a cover glass. Optionally, the add-on type touch display panel is a glass-film-film type touch panel.

In another aspect, the present disclosure provides a touch display apparatus having a touch display panel described herein. Examples of touch display apparatuses include, but are not limited to, an electronic paper, a mobile phone, a tablet computer, a television, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising a plurality of touch electrodes and a plurality of fill patterns;
    wherein substantially all corners of substantially all boundaries of the plurality of touch electrodes are radiused;
    the plurality of touch electrodes comprise a plurality of rows of first touch electrodes and a plurality of columns of second touch electrodes;
    a respective first touch electrode is substantially surrounded by adjacent second touch electrodes;
    a respective second touch electrode is substantially surrounded by adjacent first touch electrodes;

the respective first touch electrode has a boundary that is substantially circular except where adjacent fill patterns of the plurality of fill patterns are present;

a portion of a boundary of a respective one of the plurality of fill patterns adjacent to the respective first touch electrode follows the boundary of the respective first touch electrode; and the respective second touch electrode fills in a remaining space formed by boundaries of the adjacent first touch electrodes and respective adjacent fill patterns so that it has a shape substantially complementary to, and spaced apart from, the boundaries of the adjacent first touch electrodes and the respective adjacent fill patterns.

2. The touch substrate of claim 1, wherein a boundary of a touch electrode includes a straight portion.

3. The touch substrate of claim 1, wherein two adjacent rows of first touch electrodes being mutually insulated from each other along a column direction at an insulated intersection;

two adjacent columns of second touch electrodes being mutually insulated from each other along a row direction at the insulated intersection; and any protrusion of the two adjacent rows of first touch electrodes and the two adjacent columns of second touch electrodes at the insulated intersection is radiused.

4. The touch substrate of claim 1, wherein substantially all boundaries of the plurality of touch electrodes are continuously smoothly curved.

5. The touch substrate of claim 4, wherein a boundary of a touch electrode consists essentially of a plurality of continuous smooth curves adjacently connected by a radiused corner.

6. The touch substrate of claim 4, wherein a boundary of a touch electrode consists essentially of a single continuous smooth curve.

7. The touch substrate of claim 1, wherein substantially all corners of substantially all boundaries of the plurality of fill patterns are radiused.

8. The touch substrate of claim 7, wherein at least one of the plurality of fill patterns is a mosaic pattern comprising at least two sub-patterns, substantially all corners of substantially all boundaries of the at least two sub-patterns are radiused.

9. The touch substrate of claim 7, wherein the plurality of fill patterns have a boundary substantially complementary to corresponding portions of adjacent touch electrodes.

10. The touch substrate of claim 7, wherein a boundary of a fill pattern includes a straight portion.

11. The touch substrate of claim 7, wherein substantially all boundaries of the plurality of fill patterns are continuously smoothly curved.

12. The touch substrate of claim 11, wherein a boundary of a fill pattern consists essentially of a plurality of continuous smooth curves adjacently connected by a radiused corner.

13. The touch substrate of claim 11, wherein a boundary of a fill pattern consists essentially of a single continuous smooth curve.

14. A mask plate for fabricating the touch substrate of claim 1.

15. The mask plate of claim 14, wherein substantially all boundaries of the plurality of touch electrodes are continuously smoothly curved.

16. A method of fabricating a touch substrate, comprising forming a plurality of touch electrodes and forming a plurality of fill patterns on a substrate;

wherein substantially all corners of substantially all boundaries of the plurality of touch electrodes are formed to be radiused;

wherein forming the plurality of touch electrodes comprises forming a plurality of rows of first touch electrodes and forming a plurality of columns of second touch electrodes;

a respective first touch electrode is formed to be substantially surrounded by adjacent second touch electrodes;

a respective second touch electrode is formed to be substantially surrounded by adjacent first touch electrodes;

the respective first touch electrode has a boundary that is substantially circular except where adjacent fill patterns of the plurality of fill patterns are present;

a portion of a boundary of a respective one of the plurality of fill patterns adjacent to the respective first touch electrode follows the boundary of the respective first touch electrode; and the respective second touch electrode fills in a remaining space formed by boundaries of the adjacent first touch electrodes and respective adjacent fill patterns so that it has a shape substantially complementary to, and spaced apart from, the boundaries of the adjacent first touch electrodes and the respective adjacent fill patterns.

17. The method of claim 16, wherein substantially all boundaries of the plurality of touch electrodes are formed to be continuously smoothly curved.

\* \* \* \* \*